US009702428B2

(12) United States Patent
Cannell et al.

(10) Patent No.: US 9,702,428 B2
(45) Date of Patent: Jul. 11, 2017

(54) PASSIVE HEAVE COMPENSATOR (71) Applicant: TECHNIP FRANCE, Courbevoie (FR)

(72) Inventors: David Cannell, Culsalmond (GB);
Christophe Labbe, Rio de Janeiro (BR); Eric Odigie, Aberdeen (GB);
Shaun Riddell, Aberdeen (GB)

(73) Assignee: TECHNIP FRANCE (FR)

( * ) Notice: Subject to any disclaimer, the term of this patent is extended or adjusted under 35 U.S.C. 154(b) by 12 days.

(21) Appl. No.: 14/766,225

(22) PCT Filed: Feb. 5, 2014

(86) PCT No.: PCT/IB2014/000171
§ 371 (c)(1),
(2) Date: Aug. 6, 2015

(87) PCT Pub. No.: WO2014/122526
PCT Pub. Date: Aug. 14, 2014

(65) Prior Publication Data
US 2015/0362039 A1    Dec. 17, 2015

(30) Foreign Application Priority Data
Feb. 7, 2013 (GB) .................................. 1302150.6

(51) Int. Cl.
*E21B 19/00* (2006.01)
*F16F 9/53* (2006.01)
(Continued)

(52) U.S. Cl.
CPC .............. *F16F 9/535* (2013.01); *B63B 39/03* (2013.01); *B66C 13/10* (2013.01); *B66C 23/53* (2013.01);
(Continued)

(58) Field of Classification Search
CPC .............................. E21B 19/002; E21B 19/006
See application file for complete search history.

(56) References Cited

U.S. PATENT DOCUMENTS

| 3,912,227 | A |   | 10/1975 | Meeker et al. | ................ 254/172 |
| 4,003,472 | A | * | 1/1977 | Reynolds | ................ B66C 13/02 |
|  |  |  |  |  | 212/270 |
| 4,121,806 | A | * | 10/1978 | Iato | ........................ E21B 19/09 |
|  |  |  |  |  | 166/355 |
| 6,131,709 | A |   | 10/2000 | Jolly et al. | ................. 188/267.2 |

(Continued)

FOREIGN PATENT DOCUMENTS

EP    1 908 985 A1    4/2008

OTHER PUBLICATIONS

International Preliminary Report on Patentability dated Aug. 11, 2015 issued in PCT International Application No. PCT/IB2014/000171.

(Continued)

Primary Examiner — Matthew R Buck
Assistant Examiner — Aaron Lembo
(74) Attorney, Agent, or Firm — Ostrolenk Faber LLP (57) ABSTRACT A passive heave compensator having: a main hydraulic cylinder, including a moveable piston having a piston rod extendible through the main hydraulic cylinder and a piston head to divide the main hydraulic cylinder between a gas phase above the piston head, and oil phase below the piston head; an upper connection point associated with the main hydraulic cylinder and a lower connection point associated with the piston rod; and an accumulator having a moveable separator to divide the accumulator between a gas phase above the separator, and an oil phase below the separator and being in communication with the oil phase in the main hydraulic cylinder; wherein an oil phase includes a magnetorheological substance, and that the passive heave compensator includes one or more electromagnetic controllers. In this way, operation of the one or more electromagnetic (Continued)

controllers can magnetize the magnetorheological substance to vary the viscosity of the oil phase, thus changing the degree of damping that can be provided by the passive heave compensator.

14 Claims, 5 Drawing Sheets

(51) Int. Cl.
  *B63B 39/03* (2006.01)
  *B66C 13/10* (2006.01)
  *B66C 23/53* (2006.01)
(52) U.S. Cl.
  CPC .......... *E21B 19/002* (2013.01); *E21B 19/006* (2013.01); *F16F 2222/06* (2013.01); *F16F 2224/045* (2013.01)

(56) References Cited

U.S. PATENT DOCUMENTS

| | | |
|---|---|---|
| 7,934,561 B2 | 5/2011 | Ormond |
| 2005/0074296 A1 | 4/2005 | McCarty et al. |
| 2011/0180160 A1 | 7/2011 | Froehlich et al. ............ 137/455 |

OTHER PUBLICATIONS

UKIPO Search Report dated May 21, 2013 issued in UK Patent Application No. 1302150.6 (now granted as UK Patent No. 2503062B).

"Cranemaster Technology." Cranemaster Technology—Passive Heave Compensation—Shock Absorber. Accessed Dec. 20, 2012. <http://cranemaster.no/technology/technology.html>.

International Search Report dated Mar. 9, 2015 issued in corresponding International patent application No. PCT/IB2014/000171.

\* cited by examiner

PASSIVE HEAVE COMPENSATOR

CROSS REFERENCE TO RELATED APPLICATIONS

The present application is a 35 U.S.C. §371 National Phase conversion of PCT/IB2014/000171, filed Feb. 5, 2014, claiming the benefit of United Kingdom Application no. 1302150.6, filed Feb. 7, 2013, the disclosure of which is incorporated herein by reference. The PCT International Application was published in the English language.

TECHNICAL FIELD OF THE INVENTION

The present invention relates to a passive heave compensator and its method of use, particularly for offshore use.

BACKGROUND OF THE INVENTION

In general, offshore passive heave compensators are designed to reduce the impact of significant load variations that are possible during offshore heavy lifting or transfer, generally due to the variable motions of either the lifting point or the load, or indeed both. Such compensators can reduce the dynamic forces in the lifting wire or host wire caused by the motion of the sea from or on the load, to the lifting point. They use a mixture of hydraulics and pneumatic dampers to help compensate for such load variations. Their uses include the transfer or lifting of loads: between static points and floating vessels, between floating vessels, or offloading units from such vessels; as well as in various subsea operations such as lowering units to a sea bed, and in 'overload protection' in subsea environments.

U.S. Pat. No. 7,934,561 B2 discloses a subsea passive heave compensator as an 'in line tool' that uses the principles of spring isolation to generate a net heave compensation effect or spring isolation effect. The unit is a 'nitrogen over oil' spring dampening device, and its invention uses 'pressure balancing' to mitigate/eliminate the effect that hydrostatic pressure has on such units when used in deeper water.

Ernst-B. Johansen a.s. supply units under the trademark CRANEMASTER® as passive heave compensating systems, which are self-contained hydraulic/pneumatic units charged with an internal gas pressure and oil volume. The CRANEMASTER® units are able to absorb peak loads: such as for example a transfer lift between a supply vessel and a rig, or at splash zones, when items with large surface areas are lowered through the splash zone.

The CRANEMASTER® units generally have a different preset "point of stroke" (i.e. the load at which the piston will start to extend, achieved by adjusting the pretension pressures etc.), depending on their use. For example, where a CRANEMASTER® unit is used in a splash zone or for subsea lifts, the CRANEMASTER® is normally pre-set so that the piston rod initially extends to about ⅔ of its length when in air, and retracts to about ⅓ of its length when submerged. Above water, the CRANEMASTER® unit is free cycle, responding to its surroundings and catching slack wire when being in line to lift a load through a splash zone. When the load is fully submerged, the unit then acts as a passive heave compensator to reduce the vertical displacement and thus landing speed of the load. When working mainly as a subsea heave compensator, the unit is instead pre-set to cycle about ⅓ to ½ of its full stroke. This leaves the load in a more stable state as the unit absorbs motion and vibrations transmitted by the wire. As the load being installed will be exposed to less dynamic motion, it is possible to control the vertical displacement and landing speed, and thereby provide a safer installation.

For transfer lifts between vessels, the unit can be preset to absorb peak loads due to the vessel's motion in the waves relative to a rig.

The CRANEMASTER® unit can also be pre-set to reduce or avoid resonance.

For retrieving objects from the sea bed, the CRANEMASTER® unit can be pre-set to initially be at a zero stroke. Thus, when used for retrieving subsea structures, the unit is able to take up the vessel's motion 'topside' on the surface, and protect the crane from overload. The unit uses its spring force provided by the pre-set gas pressure to ensure a controlled retrieval of the subsea equipment from its installed position. As the crane starts lifting, the increased tension in the crane wire makes the unit extend until the tension of the crane wire exceeds the force necessary for pulling the object out of the seabed. Once lifted, the unit can ensure a controlled retraction, catching up slack wire and acting as a passive heave compensator as the load is lifted towards the surface.

However, the CRANEMASTER® units cannot be changed from their pre-set compensation during operation, and they are only efficient when operating in the conditions they were tuned for. They are distinctly less effective when used for different uses, and they cannot be pressure-compensated for use at different depths. This becomes a more significant issue in very deep depths.

Figure 1:
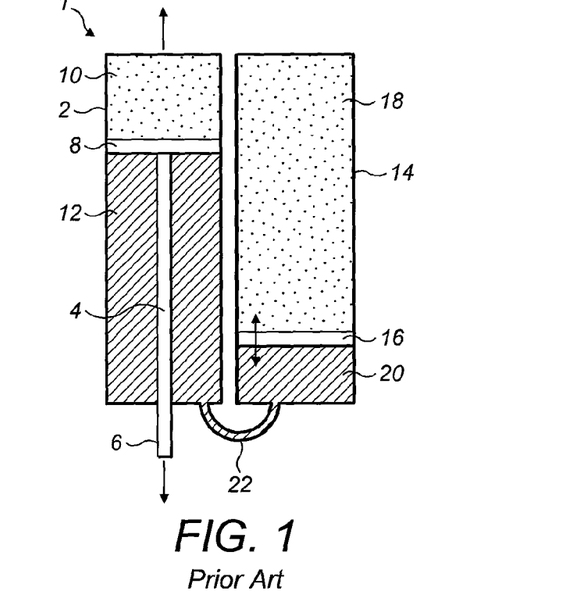
FIG. 1 is a cross-sectional schematic view of a prior art passive heave compensator.

FIG. 1 of the accompanying drawings shows a cross-sectional schematic view of an example of a prior art passive heave compensator 1 to illustrate this. The prior art compensator 1 has a main hydraulic cylinder 2 housing a moveable piston 4 and piston rod 6. The compensator 1 is generally in line with the lifting of a load, and thus has a 'top' and 'bottom' relative to the vessel or seabed etc. The top of the main hydraulic cylinder 2 has an upper connection point (not shown) to attach to a lifting wire or the like, and a load (not shown) is attached to the free end of the piston rod 6 using a lower connection point (not shown). The piston 4 has a piston head 8 which completely divides the main hydraulic cylinder 2 between a first compressed gas portion 10, and a first oil portion 12. Next to the main hydraulic cylinder 2 is an accumulator 14 having a moveable separator 16 dividing the accumulator volume into a second gas portion 18, and a second oil portion 20. The first and second oil portions 12, 20 are in communication via a passageway 22.

In use, the expected load and the loading limits for the intended use of the passive heave compensator are considered, and the volume and pressure of each of the gas and oil portions are calculated so as to provide the correct range of damping for the expected load or loading, based on an expected or desired displacement of the piston within the main hydraulic cylinder. In this way, the passive heave compensator is 'pre-tensioned' to the expected load variation or other load limitations.

However, as the passive heave compensator shown in FIG. 1 is a self-contained unit, the pressures and volumes of the gas and oil phases cannot be adjusted during operation. That is, the compensator is considered to be 'pre-set'. As such, a prior art compensator is not efficient when used in any different load conditions, or for significantly different loads, or even for different uses.

SUMMARY OF THE INVENTION

It is one object of the present to provide a passive heave compensator having a variable damping or load-compensation effect.

According to a first aspect of the present invention, there is provided a passive heave compensator comprising:

a main hydraulic cylinder, including a moveable piston having a piston rod extendible through the main hydraulic cylinder and a piston head to divide the main hydraulic cylinder between a gas phase above the piston head, and oil phase below the piston head;

an upper connection point associated with the main hydraulic cylinder and a lower connection point associated with the piston rod; and an accumulator having a moveable separator to divide the accumulator between a gas phase above the separator, and an oil phase below the separator and being in communication with the oil phase in the main hydraulic cylinder;

characterized in that an oil phase includes a magnetorheological substance, and that the passive heave compensator includes one or more electromagnetic controllers.

In this way, operation of the one or more electromagnetic controllers can magnetise the magnetorheological substance to vary the viscosity of the oil phase, thus changing the degree of damping that can be provided by the passive heave compensator.

The magnetorheological substance may be any suitable single element or combination of elements, which is or are able to change the viscosity of the oil phase. One suitable magnetorheological substance comprises iron particles, such as iron filings, which can be suspended in a suitable carrier fluid such as corn oil.

Optionally, the magnetorheological substance is included in at least the oil phase of the main hydraulic cylinder, further optionally in all the oil phases of the passive heave compensator.

Optionally, an electromagnetic controller is a variable electromagnet. An electromagnet can be provided in a suitable size, shape or form, and could be located in any suitable position to affect the magnetorheological substance. One location is in the oil phase of the main hydraulic cylinder; others include on, around or in the form of oil phase communication such as passageway between the main hydraulic cylinder and the accumulator. Such an electromagnet could be in the form of a coil.

Control and/or power can be provided to the one or more electromagnetic controllers in a number of ways, and the invention is not limited thereto. Preferably, the one or more electromagnetic controllers are controllable by a transmitter/receiver arrangement, or by a stand-alone system.

In one embodiment of the present invention, the one or more electromagnetic controllers are controllable by a remote operator, such as in an ROV or remote cage, which could be located close to the passive heave compensator when it is desired to operate at least one of the electromagnetic controllers.

Alternatively, the one or more electromagnetic controllers are controllable by relays along the lifting wire attached to the upper connection point.

Further alternatively, the one or more electromagnetic controllers are controllable by a stand-alone system mounted on or in the passive heave compensator. This arrangement could automatically adjust the settings on or in the passive heave compensator to ensure the motion of the load attached thereto is minimal.

In general, control of the one or more electromagnetic controllers can be by a control module, a command module or both, whose location and operability of the electromagnetic controller(s) are arranged to best suit expected location and use or uses of the passive heave compensator.

Preferably, the one or more electromagnetic controllers are variable, and are able to adjust, vary or otherwise control the viscosity of the oil phase as required.

Thus, according to a second aspect of the present invention, there is provided a passive heave compensator comprising:

a main hydraulic cylinder, including a moveable piston having a piston rod extendible through the main hydraulic cylinder and a piston head to divide the main hydraulic cylinder between a gas phase above the piston head, and oil phase below the piston head;

an upper connection point associated with the main hydraulic cylinder and a lower connection point associated with the piston rod; and an accumulator having a moveable separator to divide the accumulator between a gas phase above the separator, and an oil phase below the separator and being in communication with the oil phase in the main hydraulic cylinder;

characterized in that the viscosity of the oil phase in at least the main hydraulic cylinder is variable.

According to a third aspect of the present invention, there is provided a method of providing variable compensation to a passive heave compensator as defined herein, comprising the steps of:

(a) providing loading to the passive heave compensator through the lower connection point;

(b) operating an electromagnetic controller to vary the viscosity of the oil phase of at least the main hydraulic cylinder.

In particular the present invention can allow for remote and/or self-adjustment of the passive heave compensator based on real-time measurements of load/position etc. Thus, the one or more electromagnetic controllers can provide contemporaneous compensation to the passive heave compensator.

Thus, according to an embodiment of this aspect of the present invention, there is provided a method as defined hereinabove for providing real time variable compensation to the passive heave compensator, further comprising the step of:

(c) monitoring the status of the loading on the passive heave compensator in real time and controlling the operation of the electromagnetic controller to contemporaneously vary the viscosity of the oil phase.

The terms "upper/lower" as used herein relate to the general use of passive heave compensators between a lifting wire or host wire connected to the 'top' of the main hydraulic cylinder, and a load being attached to the free end of the piston rod extending below the 'bottom' of the main hydraulic cylinder. Where the passive heave compensator may be used in other orientations, the terms "upper/lower" etc. can be orientated appropriately. The terms "upper/lower" etc. are not limiting to the present invention, but are used in their expected sense to the skilled man in the general use of passive heave compensators known in the art.

According to another embodiment of the present invention, there is provided a passive heave compensator comprising:

a main hydraulic cylinder having an upper end and a lower end;

a first connector means mounted at the upper end of the main hydraulic cylinder for connecting the main hydraulic cylinder to a load-lifting line;

a moveable piston located within the main hydraulic cylinder for reciprocal motion therein, and having a piston rod extendible through the lower end of the main hydraulic cylinder, and having a piston head;

a second connection point mounted at the lower end of the piston rod outside of the main hydraulic cylinder, for connecting the piston to a load;

a gas phase in the main hydraulic cylinder between the piston head and the upper end of the main hydraulic cylinder;

at least one oil phase below the piston head and above the lower end of the main hydraulic cylinder;

at least one accumulator in fluid communication with the main hydraulic cylinder;

a separator for reciprocal movement in the accumulator;

a gas phase in the accumulator above the separator;

an oil phase in the accumulator below the separator, said oil phase being in communication with the oil phase in the main hydraulic cylinder via the fluid communication;

a magnetorheological substance in the oil of an oil phase; and one or more electromagnetic controllers to activate the magnetorheological substance and vary the viscosity of the oil.

BRIEF DESCRIPTION OF THE DRAWINGS

Embodiments of the present invention will now be described by way of example only and with reference to the accompanying drawings in which.

DESCRIPTION OF PREFERRED EMBODIMENTS

Referring to the drawings, FIG. 1 is discussed herein above, showing an example of a prior art passive heave compensator 1 having a main hydraulic cylinder 2 and an accompanying accumulator 14. The first oil portion 12 in the main hydraulic cylinder 2 is in fluid communication via the passageway 22 with the second oil portion 20 in the accumulator 14. In this way, variation of the load or loading on the free end of the piston rod 6 (via the lower connection point) can be dampened through the passive heave compensator 1 (to the lifting wire or like attached to the upper connection point), by compression of the oil in the first oil portion 12, and the damping compensation action of the first gas portion 10 and the second gas portion 18 on the oil in the first and second oil portions 12 and 20.

The compensation is generally only optimised for one use of: to catch slack wire, reduce vertical displacement and thus landing speed of a load, absorb peak loads, reduce or avoid resonance, protect from overload, or to achieve controlled retrieval of subsea equipment; for a pre-determined load setting. The manufacturer or operator of the passive heave compensator 1 is aware of the expected load to be applied, and the expected conditions of use of the passive heave compensator 1, such that the volumes and pressures of the first and second oil and gas portions 10, 12, 18, 20 are adapted to achieve a damping operation in the expected use, within the expected loading limits, and within an expected or desired displacement of the piston 4 within the main hydraulic cylinder 2.

Figure 2:
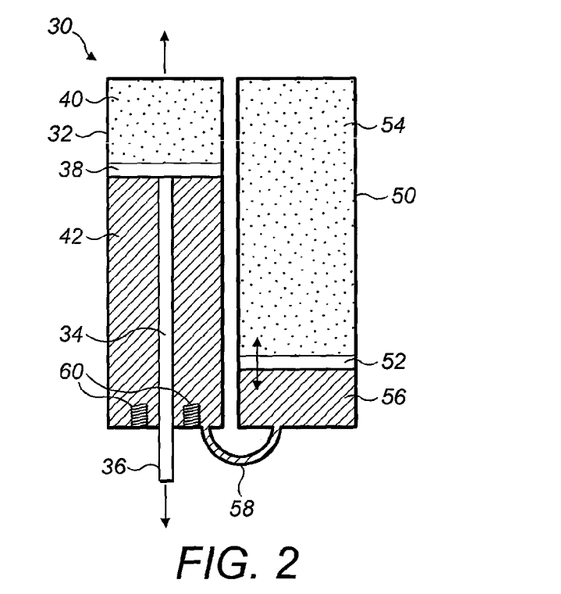
FIG. 2 is a cross-sectional schematic view of a first passive heave compensator embodiment of the present invention.

FIG. 2 shows a first passive heave compensator 30 according to an embodiment of the present invention. The first compensator 30 has a main hydraulic cylinder 32, including a moveable piston 34 having a piston rod 36 extending through the main hydraulic cylinder 32, and a piston head 38 to divide the main hydraulic cylinder 32 between a gas phase 40 above the piston head 38, and an oil phase 42 below the piston head 38. Not shown in FIG. 2 are an upper connection point connected with the main hydraulic cylinder 32, generally for attachment to a lifting wire from a crane or the like on a vessel, and a lower connection point associated with the free end of the piston rod 36, and generally connected to a load or other unit or object, optionally being lowered or lifted through a sea surface or to or from a sea bed.

FIG. 2 also shows an accumulator 50 having a moveable separator 52 to divide the accumulator 50 between a gas phase 54 above the separator 52 and an oil phase 56 below the separator 52, and being in fluid communication via passageway 58 with the oil phase 42 in the main hydraulic cylinder 32.

The oil in the oil phase 42 in the main hydraulic cylinder 32 of the first compensator 30 includes a magnetorheological substance, preferably being iron filings. The first passive heave compensator 30 also includes an electromagnetic controller in the form of an electromagnet being a coil 60 located in the oil phase 42 of the main hydraulic cylinder 32.

Figure 2A:
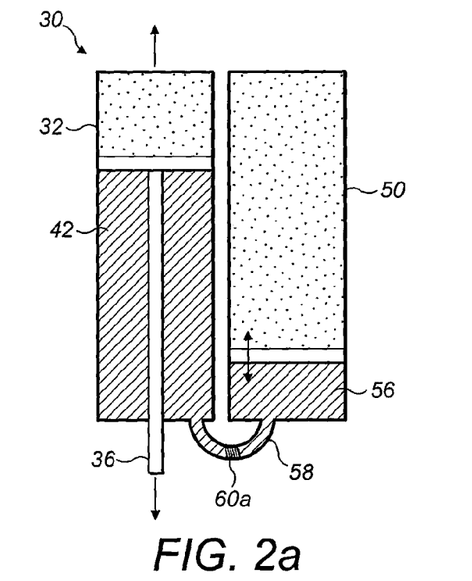
FIGS. 2a and 2b are variations of the embodiment shown in FIG. 2.

FIG. 2a shows a variation to the arrangement in FIG. 2, wherein the electromagnetic controller is in the form of an electromagnet being a coil 60a located in the passageway 58 between the main hydraulic cylinder 32 and the accumulator 50. References hereinafter to the coil 60 apply equally to the arrangement of the coil 60a.

Figure 2B:
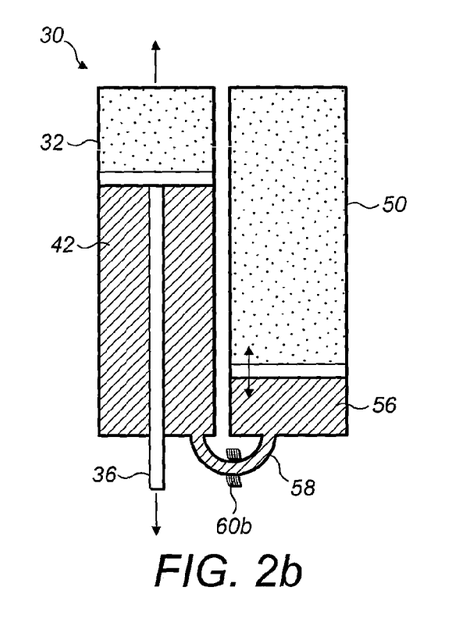

FIG. 2b shows another variation to the arrangement in FIG. 2, wherein the electromagnetic controller is in the form of an electromagnet being a coil 60b located around the passageway 58 between the main hydraulic cylinder 32 and the accumulator 50. References hereinafter to the coil 60 apply equally to the arrangement of the coil 60b.

When the coil 60 is energized, described in more detail below, it creates a magnetic field. As the magnetic field is applied to the oil including the iron filings, the viscosity of the oil phase increases, providing a different resistance force or compensation or damping to or on the piston head 38 as it moves in the main hydraulic cylinder 32, based on variation on the load or loading on the piston rod 36.

It is known in the art that when exposed to a magnetic field, a magnetorheological substance such as iron filings dispersed in a fluid will align themselves along magnetic flux lines: and that the greater the magnetic field provided by the electromagnetic controller, the greater the alignment of the iron filings, and the stronger the effect provided—resisting motion of the oil, i.e. increasing its apparent viscosity. It is generally expected that the oil exhibits no change in the viscosity of itself, but its apparent viscosity changes based on the resistance to fluid flow by the increasing alignment with the magnetic flux of the iron filings.

Thus, the first compensator 30 as shown in FIG. 2 can be adjusted to provide different compensation to variations in the load or loading, optionally in real time. The ability of the present invention to be able to vary the viscosity of the oil phase in at least the main hydraulic cylinder provides a number of advantages for the present invention, including but not limited to:

- a broader range of load or loading can be accommodated by the compensator.
- safer lifting in offshore deep water environments, especially where resonance effects can occur, removing reliance on accurate theoretical modeling prior to lift to ensure correct settings.
- increased operability of vessels, i.e. lifting vessels, enabling lifts to be conducted in a wider range of sea states.
- providing varying compensation with depth. This is particularly relevant in very deep water locations, and overcomes one of the limitations of the Cranemaster unit. However, it also allows the present invention to be used 'in air', i.e. for above-water transfer lifting, for splash zones and wave-effected zones, as well as for transition lifting above and below water, and for midwater situations with resonance potential, and for landing subsea.

By adjusting the viscosity of the oil phase, the present invention can also be tuned during operation for the different stages of a lift operation. This can be carried out automatically using "on-board" motion monitoring systems. Functional architecture of a suitable control system will be described below with reference to FIG. 5.

Figure 3A:
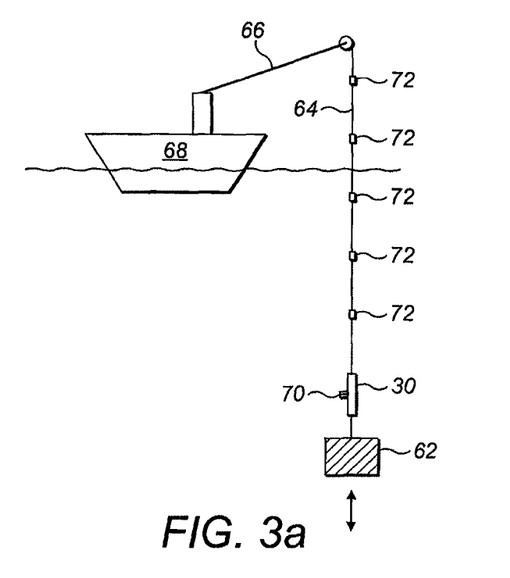
FIGS. 3a, 3b and 3c are schematic views of three methods of operating a passive heave compensator of the present invention.
Figure 3B:
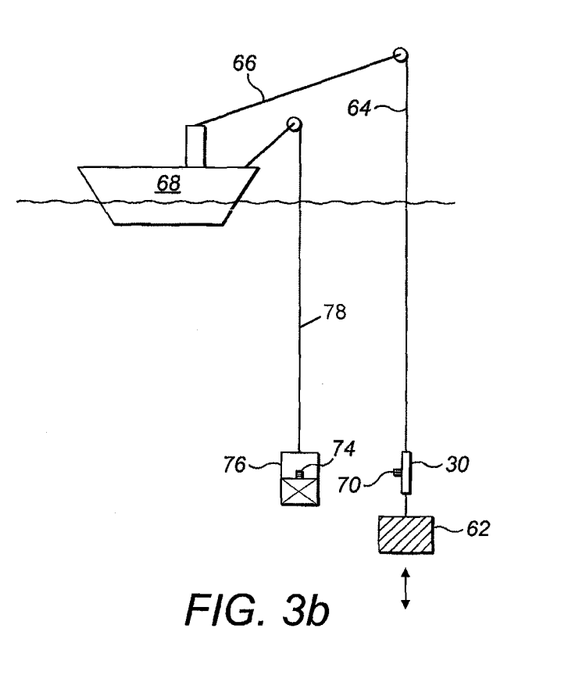
Figure 3C:
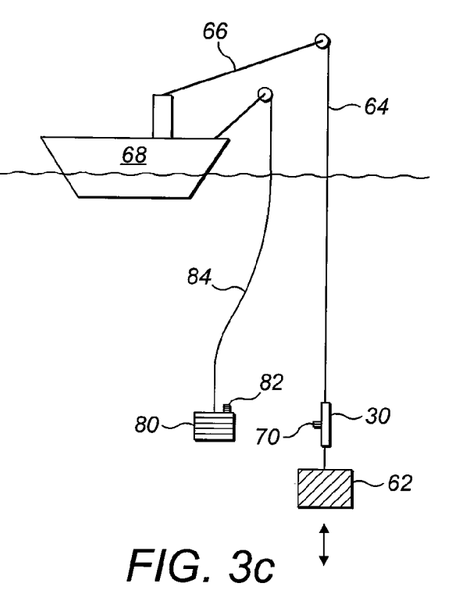

FIGS. 3a, 3b and 3c show three methods of operating a passive heave compensator according to a present invention. In a first method, FIG. 3a shows a load 62 applied to a passive heave compensator such as the first compensator 30 shown in FIG. 2. The upper connection point of the main hydraulic cylinder of the passive heave compensator 30 is attached to a lifting line 64 extending from a crane 66 on a sea-going vessel 68. The passive heave compensator 30 has a transmitter/receiver device 70 located on the outside of the main hydraulic cylinder, and multiple relay transmitter/receivers 72 are fitted to the lifting line 64 back to the vessel 68 at suitable intervals, such as in the range 100 m-500 m. Operation of the one or more electromagnetic controllers in the passive heave compensator 30 can then be provided by signals relayed to and from the vessel 68 and via the intermittent transmitters/receivers 72 along the lifting wire 64.

FIG. 3b shows a similar load 62 attached to the lower connection point of a passive heave compensator such as the first compensator 30 shown in FIG. 2, and attached to a lifting wire 64, crane 66 and vessel 68 in the same manner as FIG. 3a. A transmitter/receiver device 70 is attached to the outside of the main hydraulic cylinder of the compensator 30. In the embodiment shown in FIG. 3b, a corresponding transmitter/receiver device 74 is located in a deployment frame or cage 76 which can be deployed alongside the compensator 30. A dedicated control umbilical 78 is used both to deploy the cage 76 and to provide signals from the vessel 68 to the transmitter/receiver device 74, which can activate the electromagnetic controller(s) in the compensator 30 when in sufficient range. Functional architecture of the control system will be described below with reference to FIG. 5.

FIG. 3c shows a third method, based on a load 62 attached to a passive heave compensator such as the first compensator 30 shown in FIG. 2, and attached to a lifting line 64, crane 66 and vessel 68. Again, the compensator 30 has a transmitter/receiver device 70 located on the outside of the main hydraulic cylinder. In the method of FIG. 3c, an ROV (remote operated vehicle) 80 includes a corresponding transmitter/receiver device 82 which can be activated via an electrical umbilical 84. The ROV 80 can deploy the transmitter/receiver device 82 within range of the receiver/transmitter 70 in order to operate the one or more electromagnetic controllers in the compensator 30. Where the electromagnetic controller(s) of the passive heave system are controlled by a stand alone system, a series of sensors measuring the load and/or the position of the piston rod, etc. could be connected to the passive heave compensator to control the current etc. to the electromagnetic controller(s). The functional architecture of the control system will be described below with reference to FIG. 5.

Figure 4:
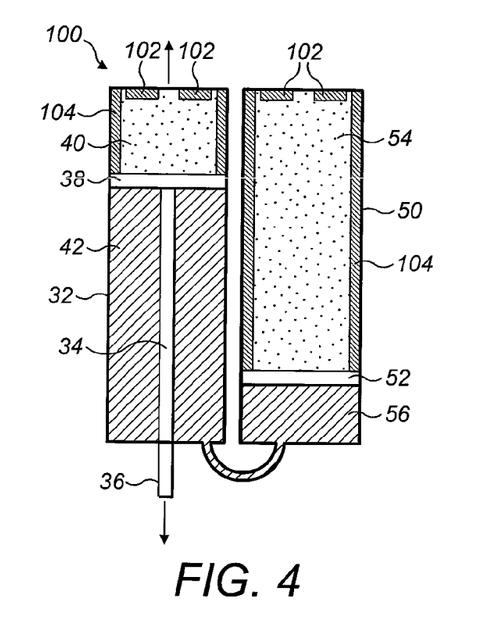
FIG. 4 is cross-sectional schematic view of an alternative passive heave compensator based on the present invention.

FIG. 4 is a cross-sectional schematic view of an alternative passive heave compensator 100 based on the present invention. Those elements or features which are the same or similar to the first compensator 30 shown in FIG. 2 have been provided with the same reference numerals for ease of reference. Thus, the main hydraulic cylinder 32 has a piston 34 having a piston rod 36 and a piston head 38 to divide the main hydraulic cylinder 32 into a gas phase 40 and an oil phase 42. Similarly, an accompanying accumulator 50 has a moveable separator 52 to divide the accumulator 50 between a gas phase 54 and an oil phase 56 which is in fluid communication via a passageway 58 with the oil phase 42 of the main hydraulic cylinder 32.

In the alternative compensator 100, one or more heaters, such as heating plates 102 are fitted into the gas phase portions 40, 54 of the main hydraulic cylinder 32 and accumulator 50. Providing heating from the heating plates 102 into the gas phase portions 40, 54 increases the temperature of the gases therein, thereby changing their viscosity and hence resistance to compression. The greater the temperature increase, the higher their viscosity. This will then provide a variable compensation or damping operation or effect on the piston head 38 and separator 52, and hence affect on the piston 34 itself during any load variation.

Optionally, the gas phase portions 40, 54 are also fitted with insulation 104 against heat loss through the walls of the main hydraulic cylinder 32 and accumulator 50.

Thus, the alternative compensator 100 shown in FIG. 4 can provide the same effect, and has the same advantages, as described for the first compensator 30 described herein above.

Figure 5:
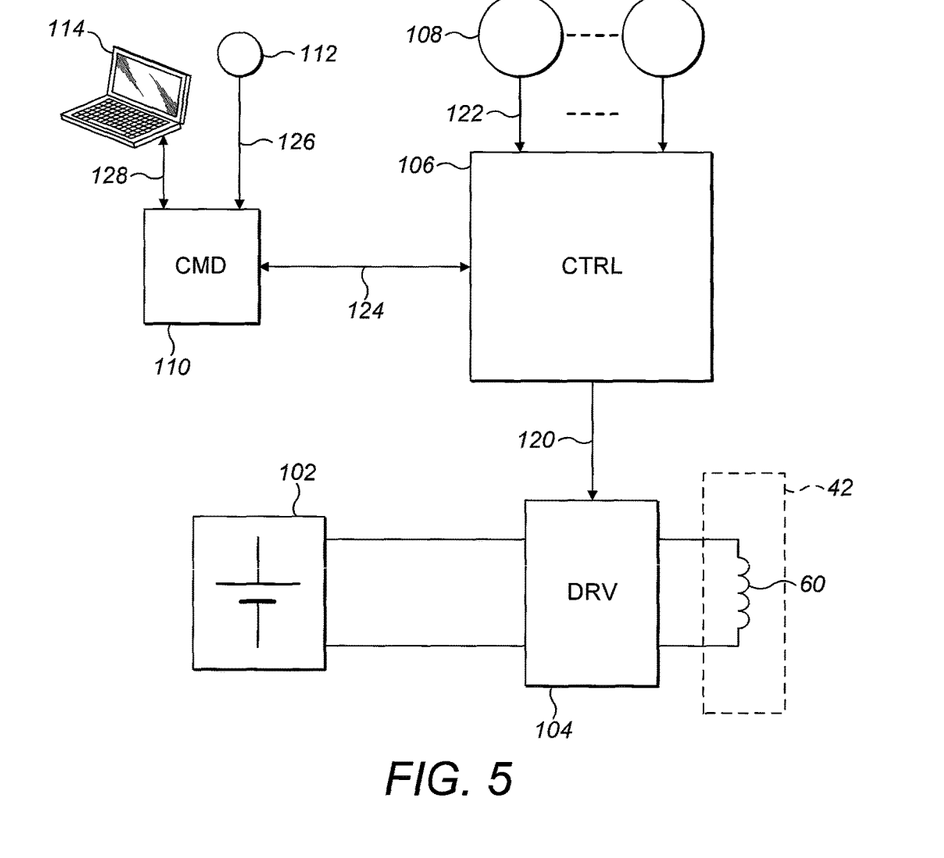
FIG. 5 is a block schematic diagram of an arrangement for driving an electromagnetic controller in the embodiments of FIGS. 2 to 4.

FIG. 5 is a block schematic diagram of principal functions of an electronic system providing command, control and driving functions for the electromagnetic controller in the embodiments described above. The electromagnetic controller in the form of coil 60 is shown at bottom right, associated with a body of magneto-rheological fluid (e.g. oil phase 42). A power source 102 is provided, for example in the form of a battery pack. A coil driver module 104 delivers current to the coil 60 under the control of signals from a control module 106 via link 120. Where there is more than one coil, these can be driven by common or independent coil driver modules, and/or by common or independent controllers. Only one of each module type is illustrated for the sake of simplicity.

Control module 106 receives input signals from a variety of separate or local sensors, such as connected sensors 108 via links 122, as mentioned already above. Control module 106 may also receive commands from a command module 110 which may be aboard the vessel 68. Command module 110 may be arranged to receive input signals from one or more additional sensors 112 and from an operator via a user interface module 114. Commands may be communicated in real-time, or only prior to deployment. Control module 106 may alternatively be completely self-sufficient.

It is a matter of design choice which parameters and/or quantities are sensed, and what level of calculation is implemented in control algorithms within control module 106 and/or command module 110. With regard to sensors, the sensors may report on the load on the compensator 30, the position of the piston, etc. Sensors may also report ambient conditions such as pressure (i.e. depth below surface) and temperatures, both outside as well as within for the various fluids, flow rates and the like.

With regard to the control algorithm, at one level, the electronic system may be "dumb", simply relaying sensor signals to the human operator, and implementing human operator's commands as to the control of the electromagnetic controller(s), e.g. the current to be delivered to the coil 60. At another level, control module 106 and/or command module 110 may implement algorithms to vary the control, e.g. coil current, autonomously and in real time. These algorithms may be open-loop or closed loop. They may apply strict decision criteria or fuzzy logic if desired. They may be pre-programmed and/or adaptive. Adaptive algorithms may learn from 'experience' within the present run or from past runs, and adjust parameters of the control algorithm to optimize one or more performance parameters of the system. Sensor signals may be logged continuously at the command module and/or logged at the control module, for subsequent download and analysis. The skilled person will readily identify suitable algorithms and combinations of algorithms, without further detail being required here.

The form of communication between modules and sensors is known in the art. Different arrangements or embodiments will involve these modules being physically separated from one another or integrated with one another. In case they are separate, then communication links 120-128 between them may be provided. The form of each communication link naturally depends on the type of data to be transmitted and the medium separating the connected modules. Transmission may be between two circuits within a single cabinet, or between circuits separated by an umbilical cable, by a body of water or by atmosphere. Local power sources (batteries) may be required for example by a sensor, separate from the power source 102.

In these embodiments, the power source 102 and driver module 104 are located on the compensator 30 itself. In a stand-alone embodiment, not separately illustrated, control module 106 and sensors 108 are also mounted on the compensator 30 and connected together for the exchange of power and data signals between them. Connection to the surface vessel via a communication link 124 is optional.

In the embodiment of FIG. 3a, transmitter/receivers 72 may form the communication link 120, with the control module 106 located on the vessel. Signals from sensors 108 located on or around the compensator may be relayed in the same way (via links 122). Alternatively, transmitter/receivers 72 may form a link 124 between the vessel and a local control module 106 which is physically mounted on the compensator. It then becomes optional whether local sensor signals need to be relayed to the surface vessel in real time. Similarly, in the embodiments of FIGS. 3b and 3c, either or both of the communication links 120 and 124 and even a power linkage to the driver 104 may extend between the compensator and the cage or ROV, and between the cage or ROV and the command vessel. In one example, the ROV or cage may serve only as an intermediate station in the communication link 120 or 124. Acoustic signaling may for example be used to provide a short range link between the ROV and the compensator, while the umbilical 78/84 is used to relay the information from the ROV to the surface vessel.

Various modifications and variations to the described embodiments of the invention will be apparent to those skilled in the art without departing from the scope of the invention as defined herein. Although the invention has been described in connection with specific preferred embodiments it should be understood that the invention as defined herein should not be unduly limited to such specific embodiments.

The invention claimed is:

1. A subsea passive heave compensator comprising:
a main hydraulic cylinder, including a moveable piston having a piston rod extendible through the main hydraulic cylinder and a piston head to divide the main hydraulic cylinder between a gas phase above the piston head, and oil phase below the piston head;
an upper connection point associated with the main hydraulic cylinder and a lower connection point associated with the piston rod; and
an accumulator having a moveable separator to divide the accumulator between a gas phase above the separator, and an oil phase below the separator and being in communication with the oil phase in the main hydraulic cylinder;
wherein an oil phase includes a magnetorheological substance, and the passive heave compensator includes one or more electromagnetic controllers.

2. The subsea passive heave compensator as claimed in claim 1 wherein the magnetorheological substance comprises iron particles and oil.

3. The subsea passive heave compensator as claimed in claim 1, wherein the one or more electromagnetic controllers are variable electromagnets.

4. The subsea passive heave compensator as claimed in claim 3 wherein the electromagnet is located in the oil phase of the main hydraulic cylinder.

5. The subsea passive heave compensator as claimed in claim 3 wherein the passive heave compensator includes a passageway for communication of the oil phases between the main cylinder and accumulator, and wherein the electromagnet is located on or around said passageway.

6. The subsea passive heave compensator as claimed in claim 1, wherein the one or more electromagnetic controllers are controllable by a remote operator.

7. The subsea passive heave compensator as claimed in claim 6 wherein the remote operator is in an ROV or remote cage.

8. The subsea passive heave compensator as claimed in claim 1, wherein the one or more electromagnetic controllers are controllable by a stand alone system mounted on or in the compensator.

9. The subsea passive heave compensator as claimed in claim 6, wherein control of the one or more electromagnetic controllers is by a control module, a command module or both.

10. The subsea passive heave compensator as claimed in claim 1, wherein the one or more electromagnetic controllers are controllable by relays along the lifting wire attached to the upper connection point.

11. The subsea passive heave compensator as claimed in claim 1, wherein the one or more electromagnetic controllers are variable.

12. The subsea passive heave compensator as claimed in claim 1, wherein the one or more electromagnetic controllers provide sea-depth pressure compensation.

13. A method of providing variable compensation to the subsea passive heave compensator as defined in claim 1, comprising the steps of:
   (a) providing loading to the subsea passive heave compensator through the lower connection point;
   (b) operating an electromagnetic controller to vary the viscosity of the oil phase of at least the main hydraulic cylinder.

14. A method as claimed in claim 13 for providing real time variable compensation to the subsea passive heave compensator, further comprising the step of:
   (c) monitoring the status of the loading on the subsea passive heave compensator in real time and controlling the operation of the electromagnetic controller to contemporaneously vary the viscosity of the oil phase.

* * * * *